(12) United States Patent
Nakamura

(10) Patent No.: US 7,594,014 B2
(45) Date of Patent: Sep. 22, 2009

(54) ABNORMALITY DETECTION SYSTEM, ABNORMALITY MANAGEMENT APPARATUS, ABNORMALITY MANAGEMENT METHOD, PROBE AND PROGRAM

(75) Inventor: Nobuyuki Nakamura, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 580 days.

(21) Appl. No.: 11/498,809

(22) Filed: Aug. 4, 2006

(65) Prior Publication Data

US 2007/0061610 A1    Mar. 15, 2007

(30) Foreign Application Priority Data

Sep. 9, 2005    (JP)    ............... 2005-262678

(51) Int. Cl.
*G06F 15/173*    (2006.01)
(52) U.S. Cl. ............... 709/224; 709/223; 726/23; 726/25
(58) Field of Classification Search ............... None
See application file for complete search history.

(56) References Cited

U.S. PATENT DOCUMENTS

| 6,108,782 | A * | 8/2000 | Fletcher et al. ............... 713/153 |
| 6,771,646 | B1 * | 8/2004 | Sarkissian et al. ............ 370/392 |
| 2003/0235280 | A1 * | 12/2003 | Shafie-Khorasani et al. ..... 379/112.01 |
| 2004/0114519 | A1 * | 6/2004 | MacIsaac ............... 370/232 |
| 2004/0168100 | A1 * | 8/2004 | Thottan et al. ............... 714/4 |
| 2004/0261030 | A1 * | 12/2004 | Nazzal ............... 715/738 |
| 2005/0286430 | A1 * | 12/2005 | Koga et al. ............... 370/241 |
| 2006/0075491 | A1 * | 4/2006 | Lyon ............... 726/22 |
| 2007/0192400 | A1 * | 8/2007 | Lee et al. ............... 709/202 |
| 2008/0281963 | A1 * | 11/2008 | Fletcher et al. ............... 709/224 |

FOREIGN PATENT DOCUMENTS

| JP | 2002-171259 A | 6/2002 |
| WO | WO 01/01272 A2 | 1/2001 |

OTHER PUBLICATIONS

Takemori, Keisuke, "An Anomaly Detection Technique using Network Profiles", IPSJ SIG Technical Reports 2005-DPS-122/2005-CSEC-28, Information Processing Society of Japan, vol. 2005, No. 33, p. 87-92, Mar. 23, 2005.

* cited by examiner

*Primary Examiner*—David E England
(74) *Attorney, Agent, or Firm*—Venable LLP; Michael A. Sartori; Yao Wang

(57) ABSTRACT

An abnormality management apparatus, connected via a network to a plurality of probes disposed at arbitrary positions in the network, comprises an abnormality level reception unit that receives information indicating an abnormality level calculated at each of the plurality of probes, an abnormality analysis unit that judges the scale of an abnormality manifesting in the network based upon an average value of the abnormality levels indicated at the plurality of probes and deviations relative to the average value and a result output unit that outputs results obtained at the abnormality analysis unit. The structure enables accurate assessment of the scale of an abnormality having occurred in the network and quick response to the abnormality by detecting its cause at an early stage.

12 Claims, 18 Drawing Sheets

FIG.4

| | MONTH A / DAY B xa: ya: za | MONTH A / DAY B xa: ya: zb | MONTH A / DAY B xa: ya: zc | MONTH A / DAY B xa: ya: zd |
|---|---|---|---|---|
| PROBE 1 | 41.6123 | 40.4165 | 35.1562 | 38.4125 |
| PROBE 2 | 20.4685 | 25.1654 | 18.4865 | 20.4862 |
| ... | ... | ... | ... | ... |
| PROBE n | 15.4864 | 30.1532 | 15.4656 | 30.1215 |

FIG.5

| ABNORMALITY LEVEL DEVIATION | ABNORMALITY LEVEL AVERAGE VALUE | |
|---|---|---|
| | NORMAL | ABNORMAL |
| NORMAL | OVERALL NETWORK IN NORMAL STATE | OVERALL NETWORK IN ABNORMAL STATE |
| ABNORMAL | LOCAL ABNORMALITY | ABNORMALITY IN PART OF NETWORK OR IN ENTIRE NETWORK |

FIG.7

| MONTH A / DAY B xa: ya: za | ABNORMALITY LEVEL | PARAMETER 1 | PARAMETER 2 | ... | PARAMETER m |
|---|---|---|---|---|---|
| PROBE 1 | 15.4655 | 1.4655 | 0.4651 | ... | ... |
| PROBE 2 | 5.04652 | 0.5416 | 0.2131 | ... | ... |
| ... | ... | ... | ... | ... | ... |
| PROBE n | 10.4566 | 1.4157 | 0.2236 | ... | ... |

FIG.8

| MONTH A / DAY B xa: ya: za | ABNORMALITY LEVEL | PARAMETER 1 | PARAMETER 2 | ... | PARAMETER m |
|---|---|---|---|---|---|
| PROBE 1 | 204.1341 | 26.3412 | 1.5123 | ... | ... |
| PROBE 2 | 190.5139 | 24.1241 | 0.4124 | ... | ... |
| ... | ... | ... | ... | ... | ... |
| PROBE n | 222.4145 | 30.4124 | 3.5794 | ... | ... |

FIG.12

| MATCHING FACTOR | PROBE RATIO |
|---|---|
| 100% | 50% |
| 90 - 99% | 5% |
| 80 - 89% | 5% |
| 70 - 79% | 5% |
| 60 - 69% | 4% |
| 50 - 59% | 4% |
| 40 - 49% | 3% |
| 30 - 39% | 3% |
| 20 - 29% | 3% |
| 10 - 19% | 3% |
| 0 - 9% | 15% |

FIG.13

| MATCHING FACTOR | PROBE RATIO |
|---|---|
| 100% | 3% |
| 90 - 99% | 5% |
| 80 - 89% | 5% |
| 70 - 79% | 5% |
| 60 - 69% | 4% |
| 50 - 59% | 4% |
| 40 - 49% | 3% |
| 30 - 39% | 50% |
| 20 - 29% | 3% |
| 10 - 19% | 3% |
| 0 - 9% | 15% |

~434

ABNORMALITY DETECTION SYSTEM, ABNORMALITY MANAGEMENT APPARATUS, ABNORMALITY MANAGEMENT METHOD, PROBE AND PROGRAM

CROSS REFERENCE TO RELATED APPLICATION

The disclosure of Japanese Patent Application No. JP 2005-262678 filed Sep. 9, 2005, entitled "Abnormality Detection System, Abnormality Management Apparatus, Abnormality Management Method, Probe and Program Executed for Abnormality Management". The contents of that application are incorporated herein by reference in their entirety.

BACKGROUND OF THE INVENTION

1. Field of the Invention

The present invention relates to an abnormality detection system, an abnormality management apparatus, an abnormality management method, a probe and a program with which an abnormality occurring in a network is managed.

2. Description of the Related Art

Today it is crucial to successfully avert trouble and disconnection in a network such as the Internet where an enormous volume of information is distributed in heavy transmission traffic. Trouble occurring in such a network includes problems caused by human interference such as a worm, as well as problems attributable to the network itself or problems occurring in electronic devices connected in the network.

There are technologies disclosed in the related art for detecting abnormalities occurring in a network by gathering in a management apparatus that manages network devices MIB (management information bases) constituted with information obtained at the individual network devices and provided to an outside apparatus to inform the outside apparatus the statuses of the individual subject network devices, calculating a characteristics value representing each network device based upon the average value, the maximum value or the minimum value indicated in the MIB and notifying a manager if the calculated characteristics value manifests a significant deviation.

There are also technologies disclosed in the related art whereby the traffic flow at a given point in the network is analyzed and a warning is issued if a problem occurs in the network or a site by monitoring the utilization of specific applications, i.e., the users of the applications and the frequency of use of the applications.

While the data obtained in the MIB are all gathered at the management apparatus and the average value is calculated by focusing on the individual values indicated in the data, the data are analyzed based upon the average value in an ambiguous manner in MIB-based abnormality detection. For instance, if the information traffic on the Internet is analyzed through a standard sampling method, an erroneous detection is bound to occur frequently since the volume of data processed is constantly changing, and thus, the adoption of the standard sampling method in such an application is likely to prove problematic in practical use.

In addition, in the network traffic monitoring method mentioned above, packets in the traffic are first analyzed at the flow level and then applications are identified or the users of the individual applications are identified. This necessitates an analysis of the payload portion of each packet containing data, which, in turn, is bound to significantly increase the load on the computer. Furthermore, an illegal packet intended to cause a bug in the program executed to analyze the payload portion may induce an erroneous operation during abnormality detection processing.

SUMMARY OF THE INVENTION

An object of the present invention, which has been completed by addressing the problems of the abnormality detection in the related art, is to provide new and improved abnormality detection system, abnormality management apparatus, abnormality management method that enable accurate assessment of the scale of an abnormality having occurred in a network and thus enable prompt response to the abnormality by detecting the cause of the abnormality at an early stage, and also to provide a new and improved program executed for such abnormality management.

The object discussed above is achieved in an aspect of the present invention by providing an abnormality detection system comprising a plurality of probes disposed at arbitrary positions in a network and an abnormality management apparatus connected to the probes via the network. The abnormality detection system is characterized in that the probes each include an abnormality level calculation unit that monitors a monitoring target, which is traffic in the network, and calculates an abnormality level of the traffic and an abnormality level transmission unit that transmits information indicating the abnormal level having been calculated to the abnormality management apparatus and that the abnormality management apparatus includes an abnormality level reception unit that receives the information indicating the abnormality level calculated at each of the plurality of probes, an abnormality analysis unit that determines the scale of an abnormality manifesting in the network based upon an average value of abnormality levels at the plurality of probes and deviations relative to the average value and a result output unit that outputs results obtained at the abnormality analysis unit.

The present invention provides an abnormality detection system capable of accurately assessing the scale of an abnormality manifesting in a network based upon the abnormality levels indicated by probes dispersed in the network to monitor traffic in the network. Such an abnormality detection system assures network security by distinguishing a local abnormality occurring over a limited area in the network from an abnormality affecting the entire network and taking measures against for instance, abnormalities affecting the entire network.

The present invention is also characterized in that an abnormality is detected by taking into consideration the deviation of the abnormality level detected at each probe relative to the abnormality levels at other probes, i.e., the deviation of the abnormality level at the probe relative to the average abnormality level, in addition to the abnormality levels at the individual probes.

While the abnormality detection system is described as a collective system that includes a plurality of apparatuses, no specific limitations are imposed with regard to which specific apparatus includes a given component or a given functional module and a component or a functional module may be provided as a stand-alone unit.

The object described above is also achieved in another aspect of the present invention by providing a probe connected via a network to an abnormality management apparatus that manages abnormalities occurring in the network and disposed at an arbitrary position in the network. The probe comprises a parameter detection unit that detects the value of a specific parameter of a monitoring target, which is traffic in the network, by monitoring the traffic, an abnormality level calculation unit that calculates an abnormality level based upon the parameter and an abnormality level transmission unit that transmits to the abnormality management apparatus information indicating the calculated abnormality level and the parameter value.

With probes adopting the structure described above dispersed in the network, the abnormality levels and the parameter values (parameter abnormality values) corresponding to a given parameter, which are related to the traffic in the network, can be detected.

The object described above is further the achieved in an aspect of the present invention by providing an abnormality management apparatus connected via a network to a plurality of probes disposed at arbitrary positions in the network. The abnormality management apparatus comprises an abnormality level reception unit that receives information indicating an abnormality level calculated at each of the plurality of probes, an abnormality analysis unit that judges the scale of an abnormality manifesting in the network based upon an average value of the abnormality levels indicated at the plurality of probes and deviations relative to the average value and a result output unit that outputs results obtained at the abnormality analysis unit.

The volume of information exchanged in a network monitored by probes is normally not constant and the traffic conditions in the network also change as the information volume changes. Accordingly, a successful judgment cannot be made easily by setting fixed evaluation criteria with regard to the abnormality levels calculated based upon the traffic conditions detected at the individual probes. According to the present invention, (1) a decision is made with regard to the extent (scale) of an abnormality in the network as a whole based upon the average value of the abnormality levels indicated by the plurality of probes and deviations relative to the average value, and (2) a decision is made as to how many probes are affected by an abnormality with a single or a plurality of parameters indicating an abnormality thereat.

The abnormality management apparatus may further include an abnormality level storage unit that stores into memory the information indicating the abnormality level having been received via the abnormality level reception unit. The abnormality management apparatus adopting this structure is capable of temporarily holding the information indicating the abnormality levels individually received from the plurality of probes with random timing and making an abnormality judgment with timing required by the abnormality analysis unit.

Together with the information indicating the abnormality level calculated at each probe, the abnormality level reception unit receives values corresponding to a plurality of parameters obtained at the probe. The abnormality management apparatus equipped with such an abnormality level reception unit may further include a cause analysis unit that counts the number of probes each indicating a parameter value corresponding to a single arbitrary parameter or parameter values corresponding to a plurality of arbitrary parameters (parameter group) with each of the parameter values contained in a specific range of a normal distribution corresponding to the parameter determined by extracting data from the plurality of probes and judges that an abnormality detected in the network is attributable to a cause related to the parameter group if the value representing the ratio (number of counted probes)/(total number of probes) is equal to or greater than a predetermined threshold value.

At each of the plurality of probes, the abnormality level and a plurality of parameter values are detected. The abnormality management apparatus operating in conjunction with the probes adopting such a structure compares the value of a given parameter or the values representing a given parameter combination at each probe with the corresponding parameter values at the other probes and executes a calculation so as to determine whether or not the parameter value for each parameter at the target probe is contained in an arbitrary range (reliable range) set for the particular parameter. Then, if an abnormality is detected to have occurred in the network and the parameter group at a significant number of probes indicates values contained in the given ranges of the normal distributions, the abnormality can be judged to have occurred due to a cause related to the parameter group.

Together with the information indicating the abnormality level calculated at each probe, the abnormality level reception unit receives values corresponding to a plurality of parameters obtained at the probe. The abnormality management apparatus equipped with such an abnormality level reception unit may further include a cause analysis unit that calculates for each probe the ratio of parameters with values contained in given ranges of the normal distributions each set in correspondence to a specific parameter by extracting data from the plurality of probes and judges that an abnormality detected in the network is attributable to a common cause if the value representing the ratio (number of probes each indicating a rational value equal to or greater than a predetermined threshold value)/(total number of probes) is equal to or greater than a predetermined threshold value.

In this case, the ratio of the number of parameters contained in the given ranges (reliable ranges) each set in correspondence to a specific parameter in relation to the parameter values at the other probes is calculated for each probe. Then, judgment can be accurately made as to whether abnormalities detected in the network are attributable to a single cause or different causes based upon the ratio of the number of parameters indicating values contained in the reliable ranges of the normal distribution to the total number of parameters.

The abnormality management apparatus may further include an attack pattern storage unit at which potential attack patterns are stored and an attack pattern extraction unit that extracts from the attack pattern storage unit an attack pattern deduced based upon probes indicating abnormalities, parameters indicating abnormal values and the abnormal parameter values all indicated in the results of an analysis executed by the abnormality analysis unit, as well as a likelihood of the deduced attack pattern.

It may further include a countermeasure pattern storage unit at which countermeasure patterns are stored and a countermeasure pattern extraction unit that extracts from the countermeasure pattern storage unit a countermeasure pattern corresponding to the attack pattern having been extracted by the attack pattern extraction unit.

The object described above is also achieved in another aspect of the present invention by providing a program executed on a computer connected via a network to a plurality of probes disposed at arbitrary positions in the network so as to enable the computer to function as the abnormality management apparatus described above.

The present invention further provides an abnormality management method to be adopted when managing abnormalities in the abnormality management apparatus connected via a network to a plurality of probes disposed at arbitrary positions in the network.

Such an abnormality management apparatus may include a probe formed as an integrated part thereof. The abnormality management apparatus assuming such a structure receives information indicating the abnormality levels from other probes and detects the abnormality level at the subject probe.

As explained above, by adopting the present invention, the scale of an abnormality having occurred in a network can be accurately assessed and quick response to the abnormality is enabled as the cause of the abnormality is detected at an early stage. In addition, the abnormality detection processing is facilitated so as to reduce the processing load, the processing performance requirements and the processing cost.

BRIEF DESCRIPTION OF THE DRAWINGS

FIG. 4 shows data containing abnormality level records of the individual probes;

FIG. 5 is a diagram provided to facilitate an explanation of the criteria based upon which the scales of abnormalities are determined;

FIG. 7 shows data containing abnormality level/parameter value records of the individual probes;

FIG. 8 shows data indicating the abnormality level/parameter value records of the individual probes;

FIG. 12 presents a table of the match factors for all the probes;

FIG. 13 presents a table of the match factors for all the probes;

DETAILED DESCRIPTION OF THE PREFERRED EMBODIMENTS

Figure 1:
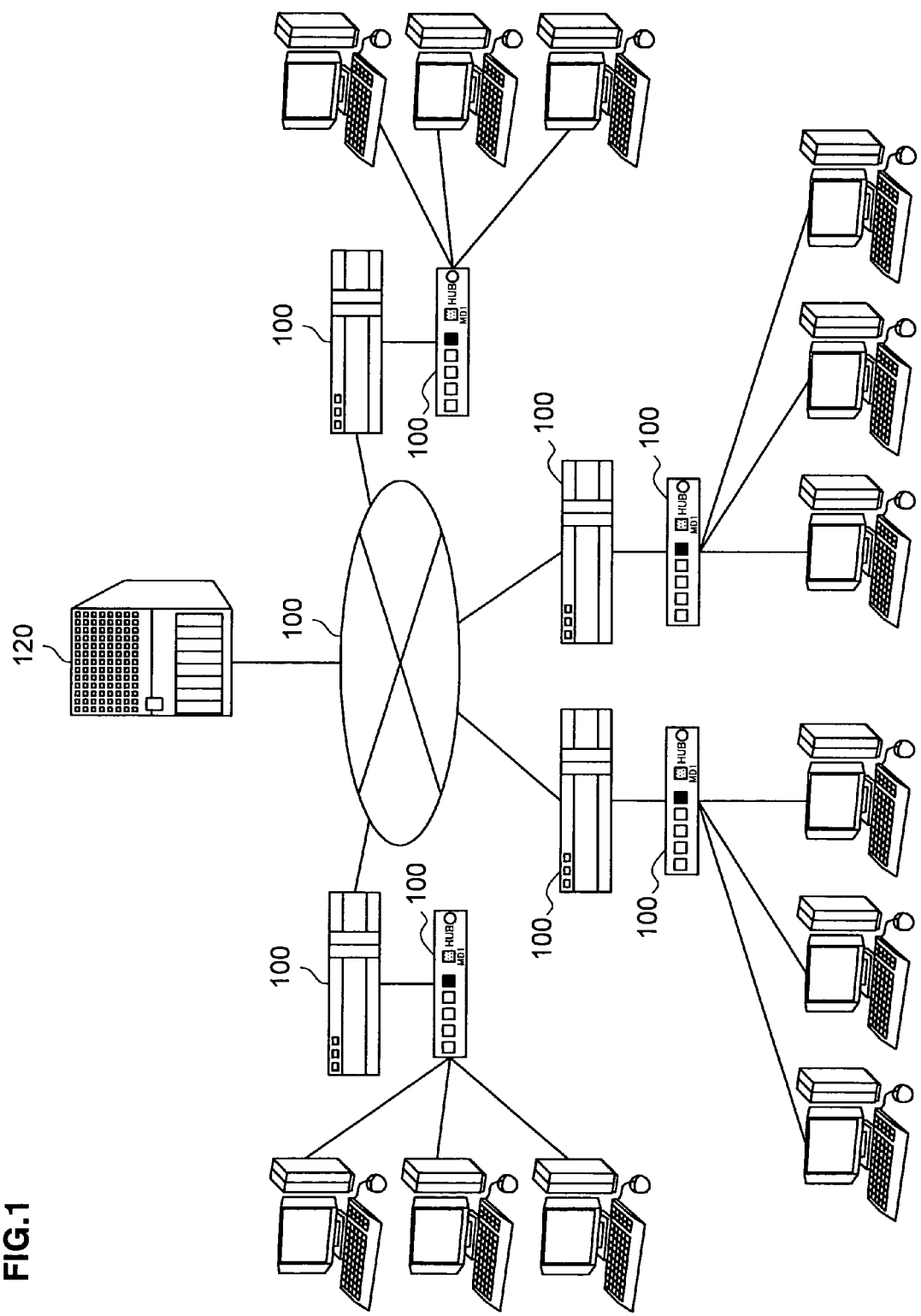
FIG. 1 is a block diagram schematically showing the structure adopted in an abnormality detection system.

The following is a detailed explanation of the preferred embodiments of the present invention, given in reference to the attached drawings. It is to be noted that in the specification and the drawings, the same reference numerals are assigned to components with substantially identical functions and structural features to preclude the necessity for a repeated explanation thereof.

(A) First Embodiment

Abnormality Detection System

FIG. 1 is a block diagram schematically showing the structure adopted in the abnormality detection system. The abnormality detection system comprises a plurality of probes 110 disposed at arbitrary positions in a network 100 and an abnormality management apparatus 120 connected to the probes 110 via the network 100.

The network 100 is a communication network such as the Internet or a LAN, and may function as a communication path connecting the probes 110 to the abnormality management apparatus 120.

The term "probe" (110) is used to refer collectively to any network device connected to the network 100 and capable of monitoring packets transmitted on the network 100. Such probes 110 may each be disposed at a branching point in the network 100, e.g., at a router, a hub, a switch or the like. The probes 110 according to the present invention are not limited to the examples described above and a probe 110 may be constituted with any of various electronic devices, e.g., by using a mirror port or the like of a switch so as to enable monitoring via a personal computer. Each probe 110 calculates the level of abnormality with regard to the traffic in the network 100 at the specific point at which the subject probe is disposed. It is also capable of detecting the values corresponding to various parameters based upon which the abnormality level is calculated. The term "traffic" in this context refers to digital data such as audio data, text data or image data transmitted on the network 100 or the information volume of such data transmitted on the network 100.

The abnormality management apparatus 120 makes decisions based upon information indicating abnormality levels and parameter values measured at the various probes 110 received via the network 100, as to whether or not an abnormality manifests at each probe 110 and as to whether or not the network 100 formed by the plurality of probes 110 manifests an abnormality. In addition, if the entire network 100 is judged to manifest an abnormality, the abnormality management apparatus makes a further decision as to whether the abnormality is attributable to a common cause at all the probes or attributable to different causes at the individual probes. Such an abnormality management apparatus 120 may be constituted with a server, a personal computer, a PDA (personal digital assistant), a portable telephone, a portable audio player, a home game console or a smart home appliance.

As described above, in the abnormality management system achieved in the embodiment, the scale of an abnormality having occurred can be accurately assessed based upon the abnormality levels measured at probes dispersed over the network and capable of monitoring data traffic in the network. Such an abnormality detection system assures a high level of network security by detecting a local abnormality that occurs in a limited portion of the network or an abnormality that occurs across the entire network and allowing countermeasures against the abnormality to be taken promptly.

The following is a detailed explanation of the probes 110 and the abnormality management apparatus 120 constituting the abnormality management system.

(B) Second Embodiment

Probes 110

Figure 2:
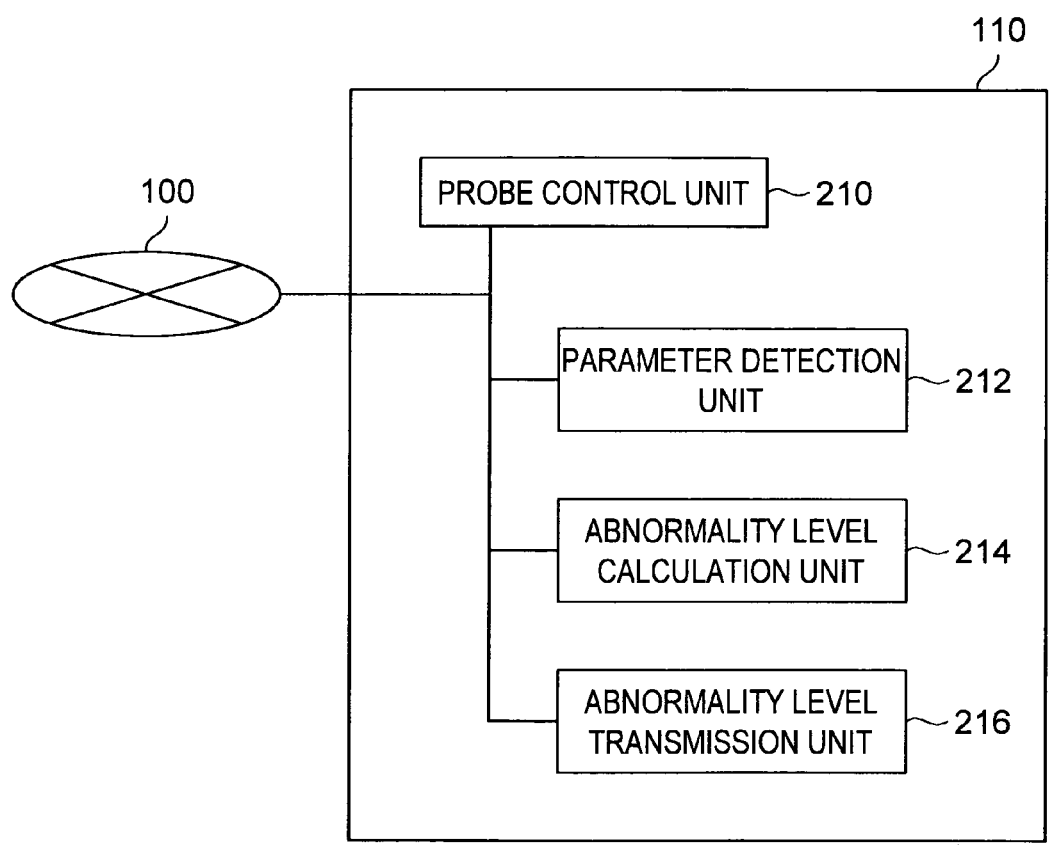
FIG. 2 is a block diagram schematically showing the structure adopted at the probes.

FIG. 2 is a block diagram schematically showing the structure adopted in the probes 110. The probes 110 each comprise a probe control unit 210, a parameter detection unit 212, an abnormality level calculation unit 214 and an abnormality level transmission unit 216.

The probe control unit 210, constituted with a semiconductor integrated circuit equipped with a central processing unit, manages and controls the entire probe 110.

The parameter detection unit 212 monitors the monitoring target, i.e., the traffic in the network 100 and detects the values of specific parameters related to the traffic.

The abnormality level calculation unit 214 calculates the level of abnormality based upon the parameter values detected by the parameter detection unit 212. The abnormality level may be calculated by adopting any of various existing methods such as calculating the sum of the parameter values detected by the parameter detection unit 212 or calculating the sum of weighted parameter values.

The abnormality level transmission unit 216 transmits to the abnormality management apparatus 120 information indicating the abnormality level calculated by the abnormality level calculation unit 214 or the parameter values detected by the parameter detection unit 212.

The abnormality management apparatus 120 to be detailed later is able to obtain the information indicating the abnormality levels and the parameter values (parameter abnormality values) corresponding to the individual parameters related to the traffic in the network 100 from the probes 110, each adopting the structure described above, which are dispersed in the network 100.

The present invention also provides a program that enables a computer to function as a probe and a storage medium having the program stored therein.

(C) Third Embodiment

Abnormality Management Apparatus 120

Figure 3:
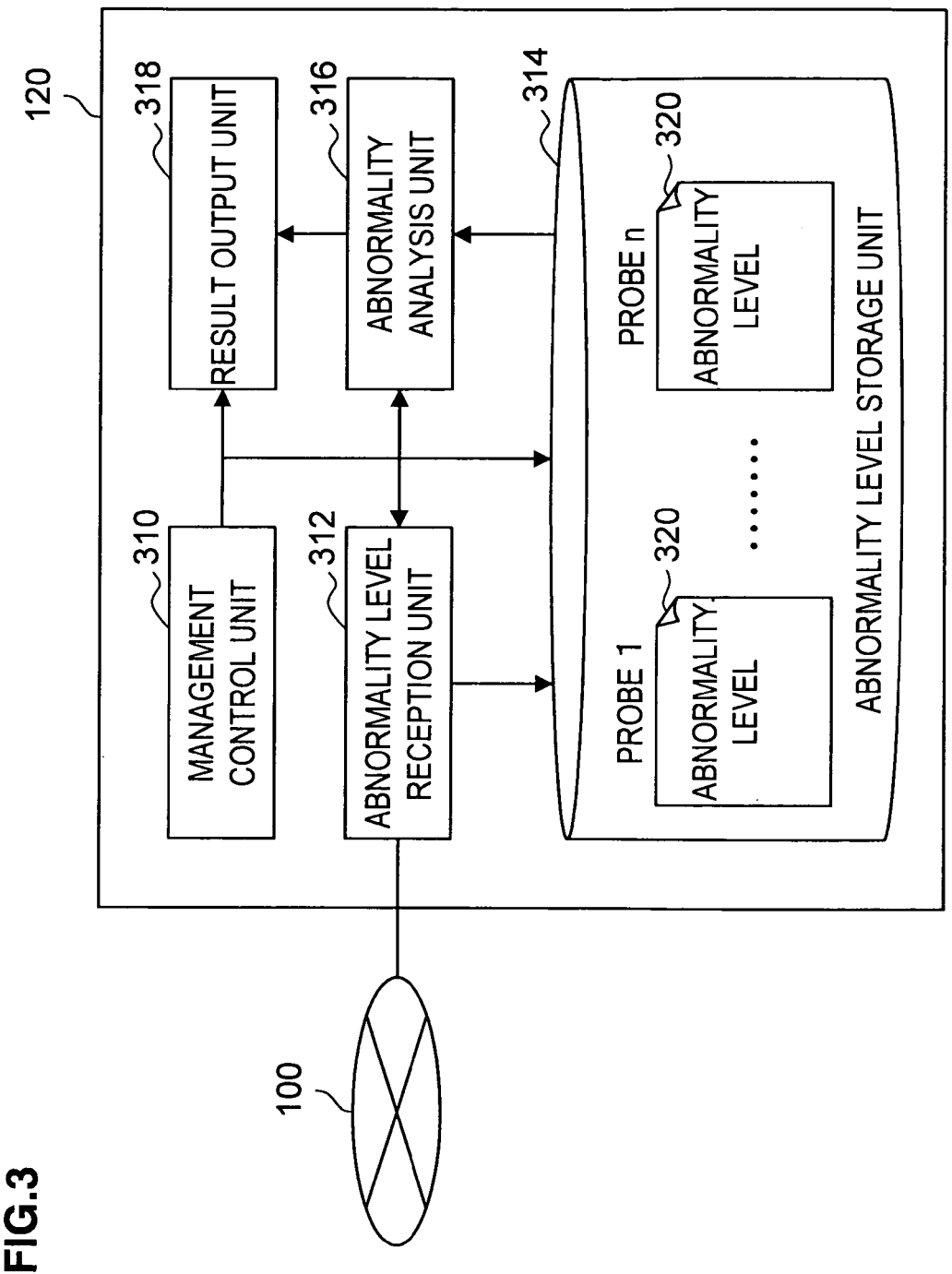
FIG. 3 is a block diagram schematically showing the structure adopted at the abnormality management apparatus.

FIG. 3 is a block diagram schematically showing the structure adopted in the abnormality management apparatus 120. The abnormality management apparatus 120 comprises a management control unit 310, an abnormality level reception unit 312, an abnormality level storage unit 314, an abnormality analysis unit 316 and a result output unit 318.

The management control unit 310, constituted with a semiconductor integrated circuit equipped with a central processing unit, manages and controls the entire abnormality management apparatus 120.

The abnormality level reception unit 312 receives the information indicating the abnormality level having been calculated at each of the plurality of probes 110. It also receives, together with the information indicating the abnormality level, information indicating the values corresponding to a plurality of parameters detected at each of the plurality of probes 110. More precisely, the abnormality level or the parameter values are provided in the form of data or a file containing the numerical value(s) indicating the abnormality level or the parameter values.

In addition, the information indicating the abnormality level is received with either the probe 110 or the abnormality management apparatus 120 acting as a principal participant. Namely, the abnormality level information having been transmitted from the probe 110 acting on its own initiative may undergo interrupt processing at the abnormality management apparatus 120, or the abnormality management apparatus 120 may obtain the abnormality level information on a regular basis on its own initiative.

The abnormality level or the parameter values having been received at the abnormality level reception unit 312 are stored into the abnormality level storage unit 314. Data indicating the abnormality levels having been calculated at the individual probes 110 may be accumulated as shown in FIG. 3, for instance. In this example, sets of data 320 each corresponding to one of probes 1 through n are stored. The abnormality level storage unit adopting this structure temporarily holds the abnormality level information received with random timing from the plurality of probes 110 so as to allow the abnormality analysis unit 316 to be detailed later to execute abnormality judgment with optimal timing. Since the abnormality level information alone is utilized as probe information in the embodiment, FIG. 3 does not show data indicating the parameter values.

The abnormality analysis unit 316 extracts the average value of the abnormality levels at the plurality of probes 100 and all the latest abnormality levels having been calculated at the probes and stored into the abnormality level storage unit 314, and makes the decision with regard to the scale of an abnormality having occurred in the network based upon deviations relative to the average value. The abnormality analysis unit 316 is capable of judging whether the abnormality manifests over the entire network or is localized. For instance, the abnormality analysis unit 316 may make a decision with regard to an abnormality manifesting over the entire network based upon the average value of the abnormality levels. Such a judgment may be executed simply by comparing the average value with a predetermined threshold value. In addition, the abnormality analysis unit 316 is capable of judging whether or not any countermeasures need to be taken to recover from the abnormality.

Alternatively, the judgment may be executed by determining whether or not the abnormality level at each probe is contained in an given range, e.g., a 90% range, of a normal distribution generated based upon the abnormality levels at the individual probes 110.

While the latest abnormality levels are extracted in the example presented above, the present invention is not limited to this example and the abnormality judgment may be executed by using past abnormality levels or most recent abnormality levels that may include past abnormality levels, as long as the abnormality levels have been ascertained over a specific time range. Alternatively, the abnormality analysis unit 316 may check with the abnormality level storage unit 314 on a regular basis and start executing the analysis when in the abnormality level information based upon which the judgment is to be executed is obtained, or an interrupt may be generated at the abnormality analysis unit 316 based upon the number of sets of abnormality level information gathered at the abnormality level storage unit 314.

The result output unit 318 embodied as a display unit, a printer, an electronic mailer, an LED or the like, outputs the results of an abnormality judgment provided by the abnormality analysis unit 316 as an alert (a warning or an alarm) in the form of an electronic mail, a buzzer sound, an ON state of an indicator or the like.

The following is a detailed explanation of the abnormality judgment executed in the abnormality management apparatus adopting the structure described above. The abnormality level information from a probe 110 having been received at the abnormality level reception unit 312 is stored into the abnormality level storage unit 314.

FIG. 4 shows data containing the abnormality level records, compiled for the individual probes 110. In the diagram presented in FIG. 4, individual probes 110 are indicated from top to bottom (probe 1 through probe n) with specific dates/times at which abnormality level information was obtained indicated from left to right.

For instance, the value indicating the abnormality level sampled at xa: ya: zc on day B in month A for the probe 1 is 35.1562 and the value indicating the abnormality level sampled at xa: ya: zd on day B in month A for the probe 1 is 38.4125. The values sampled for the other probes 110 can be read in a similar manner. FIG. 4 sequentially lists different sets of data so that newer sets of data are presented toward the right side in the figure.

The abnormality analysis unit 316 calculates the average value of the latest abnormality levels corresponding to the plurality of probes 110 (probes 1 through n). More specifically, it calculates the average value 29.6734 of the abnormality levels 38.4125, 20.4862, . . . , 30.1215 corresponding to the individual probes 1 through n, sampled at xa: ya: zd on day B in month A.

Based upon this average value, a judgment can be made as to whether or not an abnormality manifests over the entire network. However, even if the abnormality level average value is high, it cannot be immediately judged that an abnormality has manifested over the entire network, since a local abnormality having manifested at specific probes resulting in very high abnormality levels calculated for the probes may raise the average value. For this reason, the judgment as to whether or not an abnormality has occurred over the entire network must be executed by taking into consideration deviations relative to the average value.

FIG. 5 presents a diagram in reference to which the judgment criteria adopted when judging the scale of an abnormality are explained. In this example, the deviations of the abnormality levels at the individual probes from the abnormality level average value of the abnormality levels at all the probes are referenced and the referenced values are each compared with a specific threshold value.

Assuming that the predetermined threshold value used to make a decision as to whether or not an abnormality has manifested over the entire network is 25.0000, the abnormality level average value in FIG. 5 indicates "abnormal" since the abnormality level average value is 29.6734. In addition, the abnormality level deviations calculated by referencing the abnormality levels at the individual probes indicate "normal", which means that the deviation is not very significant. Accordingly, the result "abnormality over the entire network" is indicated in the diagram presented in FIG. 5.

The structure described above enables an accurate judgment of the scale of an abnormality that may have manifested over the entire network based upon the abnormality level average value by judging the extent of inconsistency among the abnormality levels, i.e., the extent of inconsistency among the abnormality values calculated at the individual probes, in correspondence to the abnormality level deviation and thus, the scale of the abnormality having manifested in the network can be accurately assessed. Furthermore, countermeasures against the abnormality can be taken promptly by detecting the cause of the abnormality at an early stage.

The present embodiment also provides a program that enables a computer to function as the abnormality management apparatus and a storage medium having the program stored therein.

(D) Fourth Embodiment

Abnormality Management Apparatus

Figure 6:
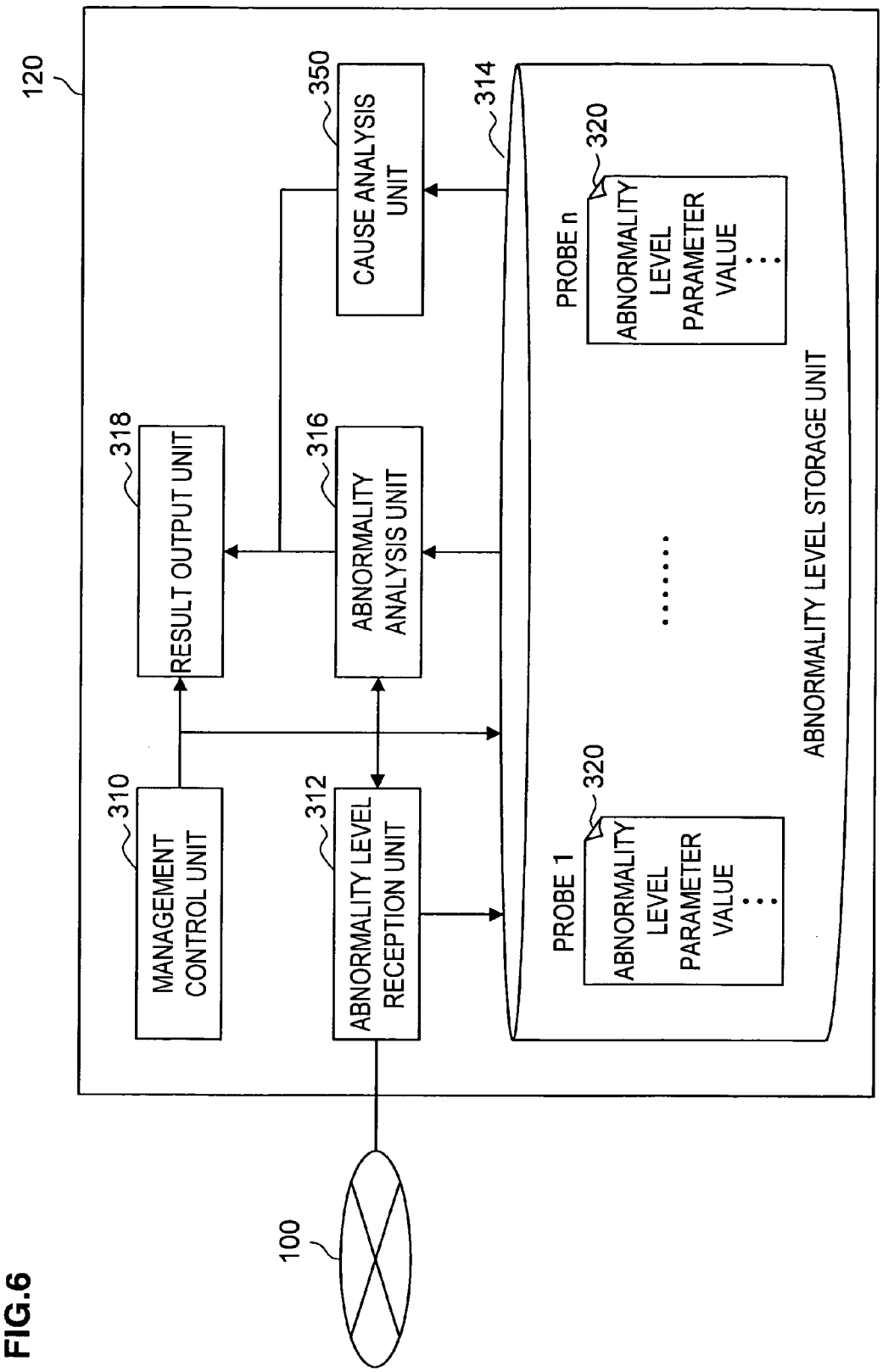
FIG. 6 is a block diagram schematically showing the structure adopted in another embodiment of the abnormality management apparatus.

FIG. 6 is a block diagram schematically showing the structure adopted in an abnormality management apparatus 120 achieved in another embodiment. This abnormality management apparatus 120 comprises a management control unit 310, an abnormality level reception unit 312, an abnormality level storage unit 314, an abnormality analysis unit 316, a result output unit 318 and a cause analysis unit 350.

Since the functions of the management control unit 310, the abnormality level reception unit 312, the abnormality level storage unit 314, the abnormality analysis unit 316 and the result output unit 318 are substantially identical to those of the components in the third embodiment, a repeated explanation is not provided here and the following explanation focuses on the cause analysis unit 350 providing a new function.

The abnormality level reception unit 312 receives the values corresponding to a plurality of parameters related to the abnormality detection as well as the abnormality level calculated at each probe 110, and the abnormality level storage unit 314 holds the values of the plurality of parameters together with the abnormality level in correspondence to each probe 110.

The abnormality analysis unit 316 judges the scale of any abnormality manifesting at each probe 110 and the scale of any abnormality manifesting over the entire network 100. If it is detected that an abnormality has manifested over the entire network, the cause analysis unit 350 is engaged in operation to analyze the cause of the abnormality.

The cause analysis unit 350 collects the values of given parameters measured at the plurality of probes 110, which are stored in the abnormality level storage unit 314 and generates a normal distribution of the values corresponding to each of the parameters thus gathered. As a result, the variance of the parameter values corresponding to each parameter is determined. Next, it counts the number of probes each indicating the parameter value corresponding to a single given parameter or the parameter values corresponding to a plurality of given parameters (parameter group) each contained in an arbitrary range of the normal distribution determined for the parameter and judges that the abnormality has manifested due to a single cause related to the given parameter group constituted with a single parameter or a plurality of parameters if the ratio (number of counted probes)/(total number of probes) is equal to or greater than a predetermined threshold value. The parameter group may include all the parameters measured in the probes.

As explained earlier, at each of the plurality of probes the abnormality level and a plurality of parameter values are detected. The abnormality management apparatus operating in conjunction with the probes 110 adopting such a structure compares the value of a given parameter or the values representing a given parameter combination at each probe with the corresponding parameter values at the other probes and executes a calculation so as to determine whether or not the parameter value at the target probe is contained in an arbitrary range (reliable range) set for each parameter. In this embodiment, the match factor with regard to the value of a given parameter measured at each probe and the reliable range for the particular parameter (an arbitrary range of the normal distribution) is determined. Then, if an abnormality is detected to have occurred in the network and a significant number of probes indicate values corresponding to the given parameter group contained in the given ranges of the normal distributions, the cause analysis unit 350 judges that the abnormality has manifested due to a cause related to the parameter group.

As described above, several parameters (parameter group) likely to be related to the cause of the probes indicating significantly high abnormality levels, are checked by verifying whether or not the parameter values measured at the individual probes 110 for the parameters in the parameter group are contained in the reliable ranges set for the individual parameters. Then, based upon the number of probes 110 indicating similar parameter value variants 100 in correspondence to the particular combination of parameters, the abnormality can be judged to have manifested due to a cause related to the parameter group. Through this method, the extent to which the abnormality is affecting the network can also be judged.

The following is a detailed explanation of the abnormality judgment executed in the abnormality management apparatus structured as described above. The abnormality level information provided by each probe 110 is received at the abnormality level reception unit 312 and is stored into the abnormality level storage unit 314. The abnormality analysis unit 316 then estimates the scale of any abnormality that may have manifested by checking the abnormality levels at all the probes 110.

If it is judged that an abnormality has occurred over the entire network based upon the judgment made by the abnormality analysis unit 316 as described above, the cause analysis unit 350 makes a decision as to what caused the abnormality, what specific parameters appear to be related to the abnormality, e.g., whether or not the abnormality has manifested due to a single worm, and the like.

FIG. 7 shows data of abnormality level/parameter value records for the individual probes 110. The individual probes 110 (probe 1 through probe n) are indicated from top to bottom, whereas the values representing the abnormality level (determined by simply referencing the traffic in this example) and the values of parameters 1 through m are indicated from left to right for each probe, with the corresponding past data accumulated along the time axis in FIG. 7.

For instance, values 15.4655, 1.4655 and 0.4651 can be respectively read for the abnormality level, the parameter 1 and the parameter 2 with regard to the probe 1, and such values can be read in a similar manner for the other probes 110 as well.

The abnormality analysis unit 316 calculates the average value of the latest abnormality levels having been calculated for the plurality of probes 110 (probes 1 through n), i.e., the average value 10.3229 of the abnormality levels 15.4655, 5.0465, . . . , and 10.4566 in the example presented in FIG. 7.

Then, deviations of the abnormality levels at the individual probes 1 through n relative to the average value 10.3229 are calculated. For instance, the deviation of the abnormality level indicated at the probe 1 is calculated to be 15.4655−10.3229=5.1426. Assuming that 3.0000 is selected as the deviation threshold value for the probes 110 and 15.0000 is selected as the average threshold value, the deviation is judged to be "abnormal" and the average value is judged to be "normal" in this case. Thus, based upon the criterion in FIG. 5, it is deduced that a localized abnormality has occurred. An investigation of this abnormality in the range indicated in FIG. 7 reveals that the abnormality level at the probe 1 is markedly higher than the abnormality levels at the other probes. While the parameter value corresponding to the parameter 1 at the probe 1 is substantially equal to the corresponding parameter value at the probe n, the parameter value corresponding to the parameter 2 measured at the probe 1 is substantially double the parameter values measured at the probes 2 and 3. This implies that an abnormality related to the parameter 2 has occurred at the probe 1.

FIG. 8 shows data of the abnormality level/parameter value records for the individual probes 110, compiled under circumstances different from those under which the data in FIG. 7 are compiled.

For instance, values 204.1341, 26.3412 and 1.5123 can be respectively read for the abnormality level, the parameter 1 and the parameter 2 with regard to the probe 1, and such values can be read in a similar manner for the other probes 110 as well.

The abnormality analysis unit 316 calculates the average value of the latest abnormality levels having been calculated for the plurality of probes 110 (probes 1 through n), i.e., the average value 205.6875 of the abnormality levels 204.1341, 190.5139, . . . , and 222.4145 in the example presented in FIG. 8.

Then, deviations of the abnormality levels at the individual probes 1 through n relative to the average value 205.6875 are calculated. For instance, the deviation of the abnormality level at the probe 1 is calculated to be 204.1341−205.6875=−1.5534. Assuming that 30.0000 is selected as the deviation threshold value for the probes 110 and 150.0000 is selected as the average threshold value, the deviation is judged to be "normal" and the average value is judged to be "abnormal" in this case. Thus, based upon the criterion in FIG. 5, it is deduced that an abnormality has occurred over the entire network. An investigation of this abnormality in the range indicated in FIG. 8 reveals that the abnormality levels at all the probes are high. Further investigation of the individual probes reveals that while the parameter values corresponding to the parameter 2 are generally low, the parameter values corresponding to the parameter 1 are generally high, albeit without a significant variance. This implies that an abnormality related to the parameter 1 has occurred over the entire network.

If it is judged that an abnormality has occurred over the entire network, as described above, the abnormality management apparatus 120 investigates the abnormality to determine its cause. In preparation for the investigation, the cause analysis unit 350 collects the values corresponding to given parameters having been measured at the plurality of probes 110, which are stored in the abnormality level storage unit 314, and generates a normal distribution of the parameter values corresponding to each parameter. For instance, assuming the parameter 1 is such a parameter, the cause analysis unit 350 calculates the extent of variance of the parameter values 26.3412, 24.1241, . . . , 30.4124 corresponding to the parameter 1 and determines the normal distribution.

Next, a decision is made as to whether or not the parameter value corresponding to a single given parameter or the parameter values corresponding to a plurality of given parameters having been measured at a specific probe 110, are contained in an arbitrary range of the normal distribution having been generated in correspondence to the given parameter. The explanation is now given by focusing on a single parameter, e.g., the parameter 1. The cause analysis unit 350 makes a decision as to whether or not the parameter value 26.3412 measured at the probe 1 is contained within the arbitrary range, e.g., a 95% range, of the normal distribution having already been generated for the parameter. The cause analysis unit then counts the number of probes each indicating the parameter value corresponding to the parameter 1 contained in the arbitrary range (reliable range) of the normal distribution generated for the particular parameter. A single parameter or a combination of a plurality of parameters may be used in this judgment, or the parameter values corresponding to all the parameters may be used.

Figure 9:
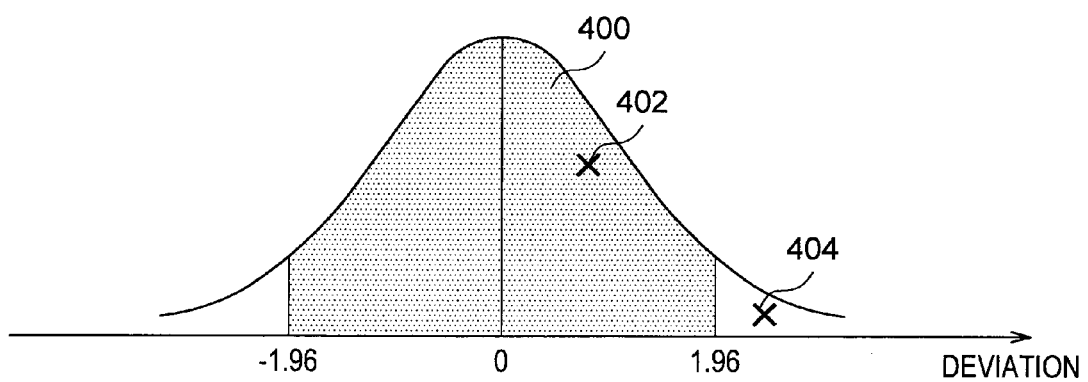
FIG. 9 schematically illustrates in arbitrary range of a normal distribution.

FIG. 9 schematically illustrates the arbitrary range of a normal distribution. This diagram shows an ideal variance with the population of the values of the parameter 1 containing infinite sample values. The value 1 may be used to represent both the standard deviation and the entire area with the average value 26.9592 for the parameter 1 set at 0 in such a standard normal distribution. The arbitrary range corresponding to the 95% range mentioned above is the range constituting an area formed with symmetry to the left in the right relative to the average value and achieving an area amounting to 95% of the entire area. The arbitrary range is the range 400 containing values, which are obtained by converting the extents of deviation, between −1.96 and +1.96.

For instance, a parameter value 402 indicating "0.8" in FIG. 9 is contained within the 95% range in the normal distribution but a parameter value 404 indicating "2.2" in FIG. 9 is not contained in the 95% range.

Lastly, the number of counted probes, e.g., 10, is divided by the total number of probes n and the quotient is compared with a predetermined threshold value. Assuming that the threshold value is 80% and that n is 11, the quotient 10/11 is greater than 0.8 and accordingly, it is judged that an abnormality has occurred in the network due to a single cause related to the parameter group. In addition, while the cause of the abnormality is investigated by using a given group of parameters measured at the probes, the cause of the abnormality may instead be determined by checking the parameter values corresponding to a single given parameter or the parameter values corresponding to all the parameters.

(E) Another Embodiment

The cause analysis unit 350 described above identifies a given parameter value to be a value close to the average value or a value greatly deviated from the average value. The following is an explanation of another embodiment in which finer details of the judgment elements are examined.

When an abnormality is detected to have occurred in the network 100, a cause analysis unit 350 achieved in the other embodiment generates a normal distribution by extracting the parameter values corresponding to each parameter from the plurality of probes 110 and then calculates in correspondence to each probe the ratio of the parameters with the values thereof contained in given ranges of the normal distributions of the individual parameters thus generated to the total number of parameters. If the value; (number of probes indicating a ratio equal to or greater than a predetermined threshold value)/(total number of probes) is equal to or greater than predetermined threshold value, it judges that the abnormality has occurred due to a single cause.

For instance, it compares the parameter values measured for a given probe 110 with the normal distributions having been generated each in correspondence to a specific parameter, counts the number of parameters indicating values contained within the arbitrary ranges of the normal distributions and divides the counted value by the total number of parameters. When the quotient indicates a higher value, the likelihood of the abnormality having occurred due to a common cause affecting other probes as well and related to a greater number of parameters is higher. Accordingly, when the ratio is equal to or greater than the predetermined threshold value at a predetermined number of probes or more, the abnormality can be judged to have occurred due to a common cause.

By comparing parameter values only for the parameters judged to be related to an abnormality affecting all the probes, the specificity of the cause can be ascertained.

The following is a detailed explanation of the abnormality judgment executed by the abnormality management apparatus adopting the structure described above. If it is judged that an abnormality has occurred over the entire network based upon the judgment made by the abnormality analysis unit 316 as described above, the cause analysis unit 350 makes a decision as to what caused the abnormality, what specific parameters appear to be related to the abnormality, e.g., whether or not the abnormality has manifested due to a single worm, and the like.

As does the cause analysis unit 350 explained earlier, the cause analysis unit in the embodiment first references the data shown in FIG. 7 and determines the normal distributions each in correspondence to one of the parameters. Then, it extracts all the parameter values corresponding to the target probe, e.g., the probe 1.

Figure 10:
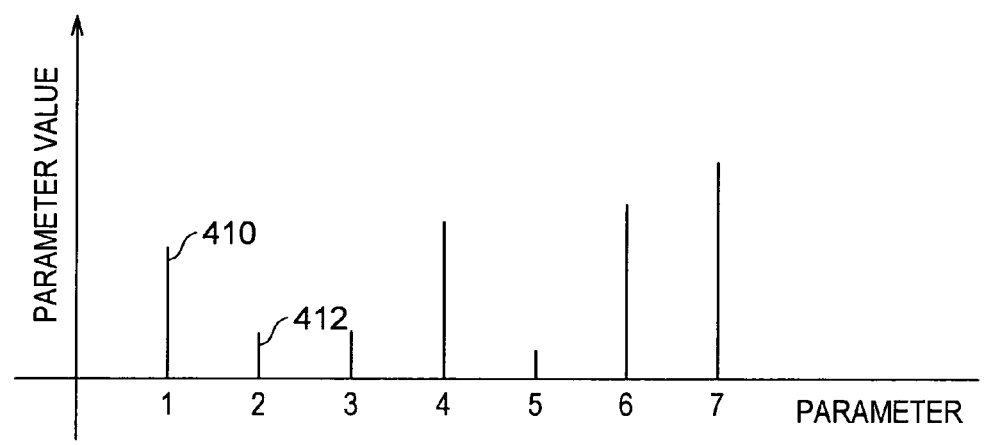
FIG. 10 is a graph of the values of all the parameters measured at a probe.

FIG. 10 is a graph of the parameter values corresponding to all the parameters measured at the probe 1. FIG. 10 shows the values of m (7) parameters. It is assumed that the value 410 corresponding to the parameter 1 is 1.4655 and that the value corresponding to the parameter 2 is 0.4651. The 95% ranges of the normal distributions set as described above are superimposed over these parameter values.

Figure 11:
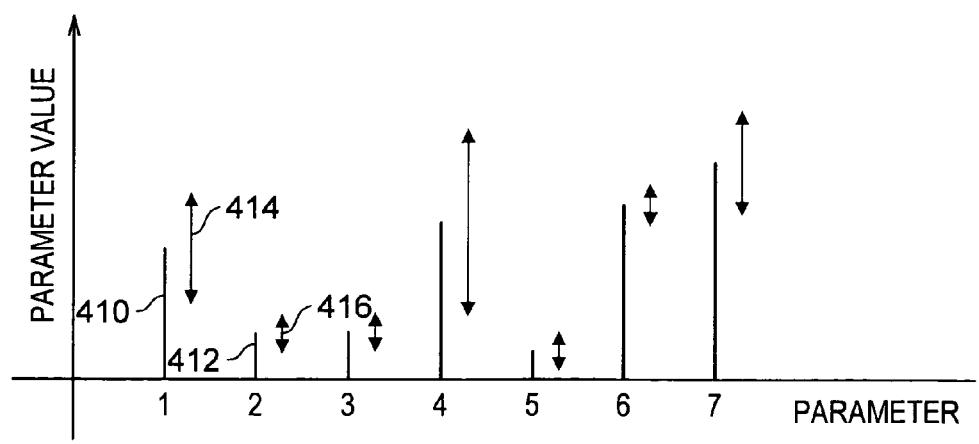
FIG. 11 is a graph of the parameter values in FIG. 10 with the 90% ranges of the normal distributions corresponding to the individual parameters superimposed over the parameter values.

FIG. 11 shows the 95% ranges of the normal destinations determined each in correspondence to one of the parameters, superimposed over the parameter values shown in FIG. 10. In FIG. 11, the 95% ranges are each indicated by a bidirectional arrow. The parameter value 410 corresponding to the parameter 1 and the parameter value 412 corresponding to the parameter 2 are both contained within the respective 95% ranges 414 and 416 of the parameters. The values of the other parameters, too, are contained within the respective 95% reliable ranges, indicating that the values of all the parameters measured for the probe 1 are within the reliable ranges.

It then calculates the ratio of the number of parameters with values contained in the given ranges to the total number of parameters (the ratio is referred to as a match factor in the description). For instance, if the number of parameters indicating values contained in the respective reliable ranges at a given probe is 3 and the total number of parameters is 7, the match factor is calculated to be 3/7=43%. This match factor is calculated for all the probes 1 through m and the distribution of the match factors is indicated in a table.

In addition, a concept shown in FIGS. 10 and 11 is also adopted when making a decision as to whether or not the values of all the parameters measured in each probe 110 are contained in the respective given ranges of the normal distributions each set in correspondence to one of the parameters. In this case, only probes indicating values corresponding to all the parameters contained within the given ranges, i.e., only the probes achieving the match factor of 100%, are counted.

FIG. 12 presents a table of match factors calculated for all the probes. In this example, the match factor is calculated as described above for all the probes, and the probes are grouped based upon their match factors. For instance, the given probe explained above with the match factor of 43% belongs in the 40~49% range 430 in FIG. 12. FIG. 12 indicates that the probes belonging in the 40~49% range account for 3% of the total number of probes.

In the event of an abnormality in the network, the distribution of the parameter values measured at all the probes and the ratios of the probes 110 in the various groups are compared. For instance, assuming that the total number of probes is 100 and that there are 10 parameters, there are 50 probes 110 indicating values corresponding to the 10 parameters all contained within the respective reliable ranges and there are five probes 110 each indicating parameter values corresponding to nine parameters contained in the respective reliable ranges, i.e., there are five probes 110 each indicating a value corresponding to a single parameter outside the reliable range.

Next, the number of probes achieving match factors equal to or greater than a predetermined threshold value, e.g., equal to or greater than 80% in FIG. 12 (indicated by the bold line 432 in FIG. 12) is divided by the total number of probes by referencing the table. The ratio of such probes to the total number of probes is 60% in this example. Assuming that an abnormality manifesting over the entire network is defined as affecting at least 60% of probes 110, match factors of 80% or higher are achieved at the affected probes 110 amounting to 60% of the total number of probes, as shown in FIG. 12. Accordingly, it is judged that eight parameters out of the ten parameters are related to a cause of the abnormality affecting the entire network (at least 60% of the probes).

Alternatively, the cause of an abnormality may be judged through another advanced clustering method. Through such advanced clustering, decisions such as "x % affected by abnormality attributable to cause A", "y % affected by abnormality attributable to cause B" and "z % affected by abnormality attributable to cause C" may be output.

FIG. 13 presents a table of match factors calculated for all the probes under circumstances different from those under which the table in FIG. 12 is generated. FIG. 13 shows different probe ratios from those in FIG. 12 for the match factor 100% and the match factor range 30~39%.

An explanation is given by assuming that an abnormality related to three parameters among the 10 parameters has been confirmed. FIG. 13 indicates that the likelihood of the parameter values corresponding to three parameters among the 10 parameters falling into the respective reliable ranges is extremely high and the ratio of the overall number of probes indicating parameter values corresponding to at least three parameters falling into the reliable ranges to the total number of probes, i.e., the accumulated value corresponding to the probes at or above the bold line 434 in FIG. 13, is 79%. Accordingly, 79% of the probes are judged to have been affected by the abnormality that has caused the 3 parameters to indicate abnormal values.

Once the number of parameters related to the cause is determined, the actual cause can be estimated by sampling the probes 110 and checking the parameter values. In addition, by checking match factors corresponding to specific combinations of parameters, the combination of parameters related to the cause of the abnormality can also be detected. There may be a very large number of possible combinations of parameters, depending upon the number of parameters. In such a case, the match factors corresponding to only likely combinations under normal circumstances may be checked. Alternatively, the match factors may be determined in correspondence to the individual parameters and the parameters with high match factors may be listed.

As described above, by referencing the match factors of the individual probes 110, decisions as to whether or not an abnormality is likely to have occurred due to a common cause and as to the number of parameters likely to be related to the cause of the abnormality can be made without having to closely examine the individual parameters for the cause of the abnormality. Such a simplification in the structure achieves reductions in the load on the system and its cost.

By assessing whether an abnormality has occurred at the probes 110 on the network due to causes completely different from one another or due to a common cause, an optimal response to the abnormality can be selected with ease.

(F) Fifth Embodiment

Abnormality Management Apparatus

Figure 14:
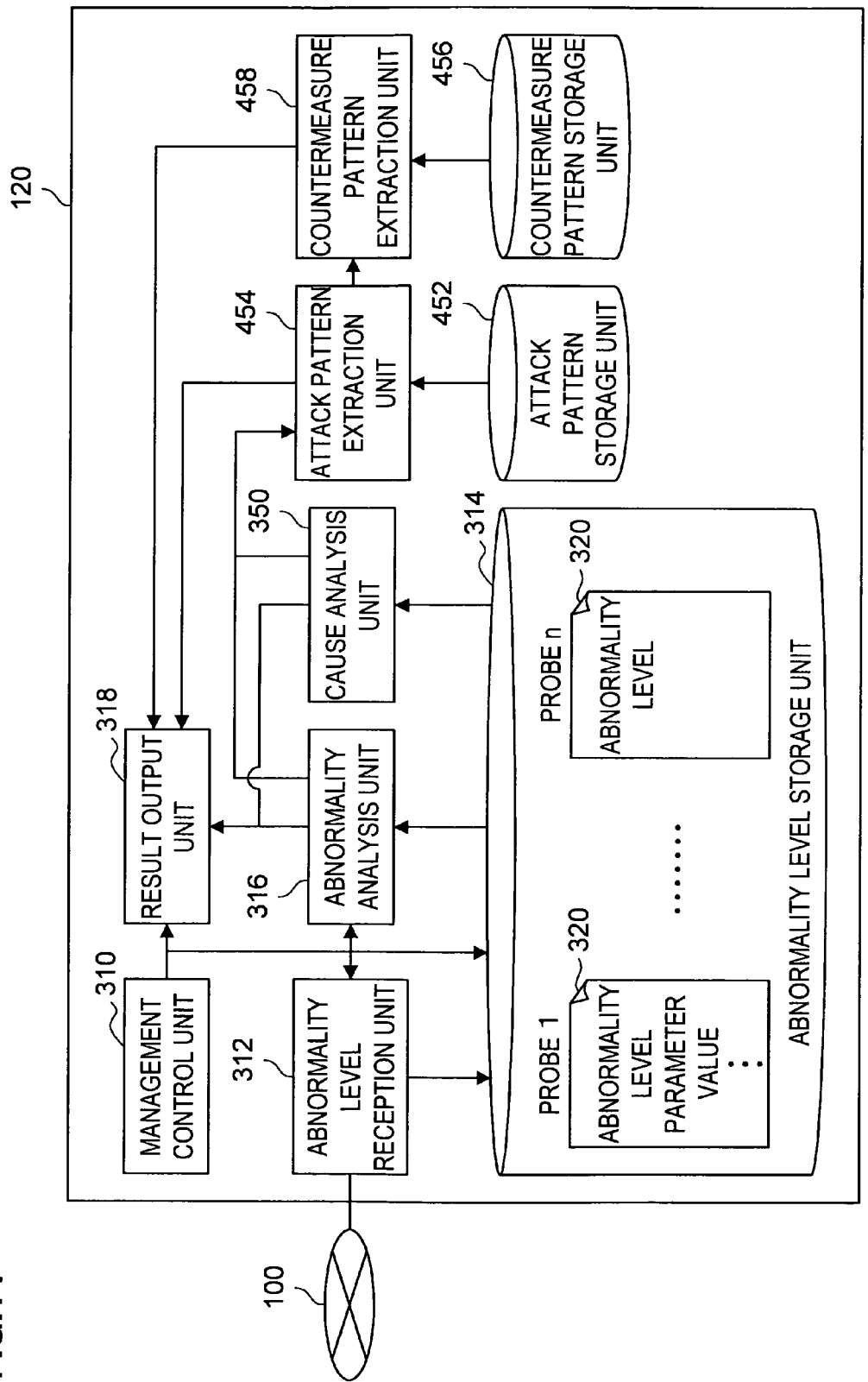
FIG. 14 is a block diagram schematically showing the structure adopted in another embodiment of the abnormality management apparatus.

FIG. 14 is a block diagram schematically showing the structure adopted in yet another embodiment of the abnormality management apparatus 120. This abnormality management apparatus 120 comprises a management control unit 310, an abnormality level reception unit 312, an abnormality level storage unit 314, an abnormality analysis unit 316, a result output unit 318, a cause analysis unit 350, an attack pattern storage unit 452, an attack pattern extraction unit 454, a countermeasure pattern storage unit 456 and a countermeasure pattern extraction unit 458.

Since the functions of the management control unit 310, the abnormality level reception unit 312, the abnormality level storage unit 314, the abnormality analysis unit 316, the result output unit 318 and the cause analysis unit 350 are substantially identical to those of the corresponding components explained in reference to the fourth embodiment, a repeated explanation is omitted and the following explanation focuses on the attack pattern storage unit 452, the attack pattern extraction unit 454, the countermeasure pattern storage unit 456 and the countermeasure pattern extraction unit 458 providing new functions.

As has been explained earlier in reference to the fourth embodiment, the abnormality management apparatus 120 judges the scale of an abnormality having occurred in the network and also extracts the cause thereof. The fifth embodiment differs from the fourth embodiment in that countermeasures are taken against the abnormality. The attack pattern extraction unit 454 and the countermeasure pattern extraction unit 458 may be engaged in operation only when an abnormality is detected by the abnormality analysis unit 316 so as to reduce the work load.

Possible attack patterns are stored in the attack pattern storage unit 452 and the attack pattern extraction unit 454 extracts a pattern from the attack pattern storage unit 452 deduced based upon the abnormal probes, the abnormal parameters and the values of the abnormal parameters as well as the likelihood of the attack pattern, indicated in the results of the analysis executed at the abnormality analysis unit 316.

Countermeasure patterns against such attack patterns are stored in the countermeasure pattern storage unit 456, and the countermeasure pattern extraction unit 458 extracts from the countermeasure pattern storage unit 456 a countermeasure pattern corresponding to the attack pattern extracted by the attack pattern extraction unit 454.

For instance, the likely culprit, i.e., the attack pattern, resulting in an error detection by the abnormality management apparatus 120 due to high parameter values indicated for a parameter "TCP port No. 139" and an abnormality detection by the abnormality management apparatus 120 due to high parameter values indicated for a parameter "ICMP host error or service error" can be assumed to be a rapid growth of a worm program that scans the TCP port No. 139 and propagates by taking advantage of the vulnerability of the program provided at the TCP port No. 139. The optimal countermeasure pattern under such circumstances may be a shutdown of the TCP port No. 139. These attack patterns and countermeasure patterns can be prepared by using existing data and more data can be subsequently added by analyzing attacks and the like that occur over time.

The attack pattern extraction unit 454 and the countermeasure pattern extraction unit 458 enable the operator to take optimal action against the detected abnormality. In addition, even if the operator does not have expert knowledge of Internet protocols, he is able to take action such as a simple adjustment of the network device settings in response to optimal instructions output by the abnormality management apparatus and in this regard, the abnormality management apparatus is more effective than an abnormality management apparatus that simply outputs information indicating an abnormal parameter.

(G) Sixth Embodiment

Specific Circuit Structure Adopted in Abnormality Management Apparatuses

Figure 15:
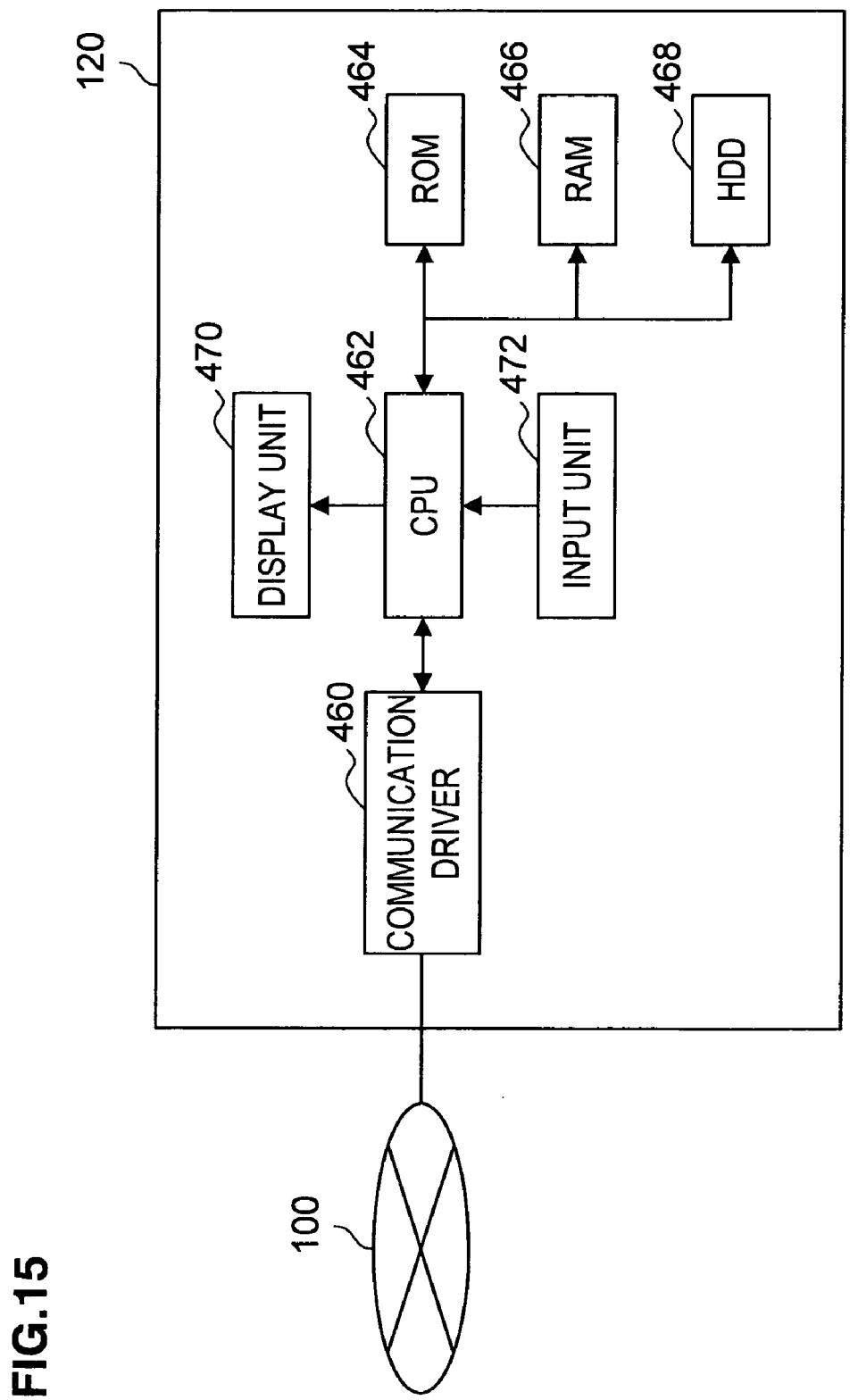
FIG. 15 is a circuit block diagram schematically showing the structure adopted in the abnormality management apparatus.

FIG. 15 is a circuit block diagram schematically showing the structure that may be adopted in the abnormality management apparatuses 120 achieved in the third, fourth and fifth embodiments. The circuit block diagram shows a more specific circuit structure that may be adopted in any of the abnormality management apparatuses 120 explained earlier.

The abnormality management apparatus 120 comprises a communication driver 460, a CPU 462, a ROM 464, a RAM 466, an HDD 468, a display unit 470 and an input unit 472.

The communication driver 460 receives information indicating abnormality levels and parameter values input thereto from the probes 110~the network 100.

The CPU 462, constituted with a semiconductor integrated circuit that executes signal processing, manages and controls the entire abnormality management apparatus 120. In the ROM 464, a program read by the CPU 462 to be used to control the abnormality management apparatus 120 is stored in advance. The RAM 466 is used as an area where specific data used to enable the CPU 462 to function as the abnormality management apparatus 120 are temporarily stored and variables are stored. In the HDD 468, a program used in the control of the abnormality management apparatus 120 is stored as in the ROM 464, in addition to other application programs.

At the display unit 470, constituted with a monochrome display unit or a color display unit and functioning as the result output unit 318, the results of abnormality judgment are displayed. The input unit 472, constituted with a key input unit (not shown) such as a keyboard or a number keypad, supports the display function of the display unit 470.

(H) Seventh Embodiment

Abnormality Management Method

Next, the abnormality management method adopted for abnormality management in a system that includes a plurality of probes 110 disposed at arbitrary positions in a network 100 and an abnormality management apparatus 120 connected with the probes 110 via the network 100 is explained.

Figure 16:
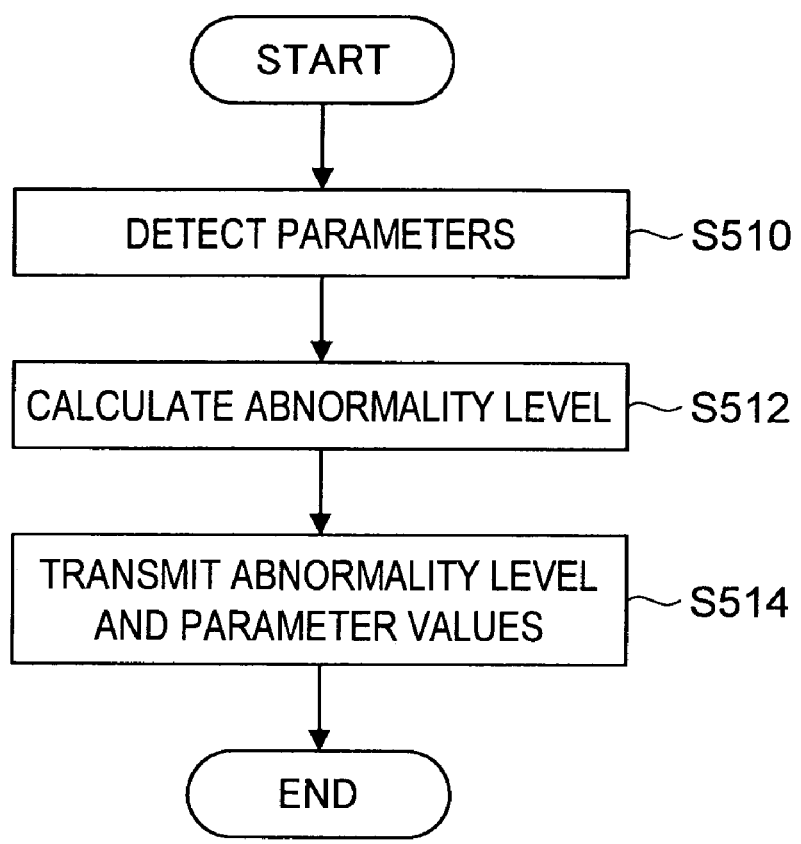
FIG. 16 presents a flowchart of the abnormality detection processing executed at each probe.

FIG. 16 presents a flowchart of the abnormality detection processing executed at each probe 110. The probe 110 monitors the monitoring target, i.e., traffic in the network, and detects values of specific parameters of the traffic (S510). It then calculates the abnormality level by, for instance, calculating the sum of the parameter values (S512). Lastly, it transmits to the abnormality management apparatus 120 the calculated abnormality level and the parameter values (S514).

Figure 17:
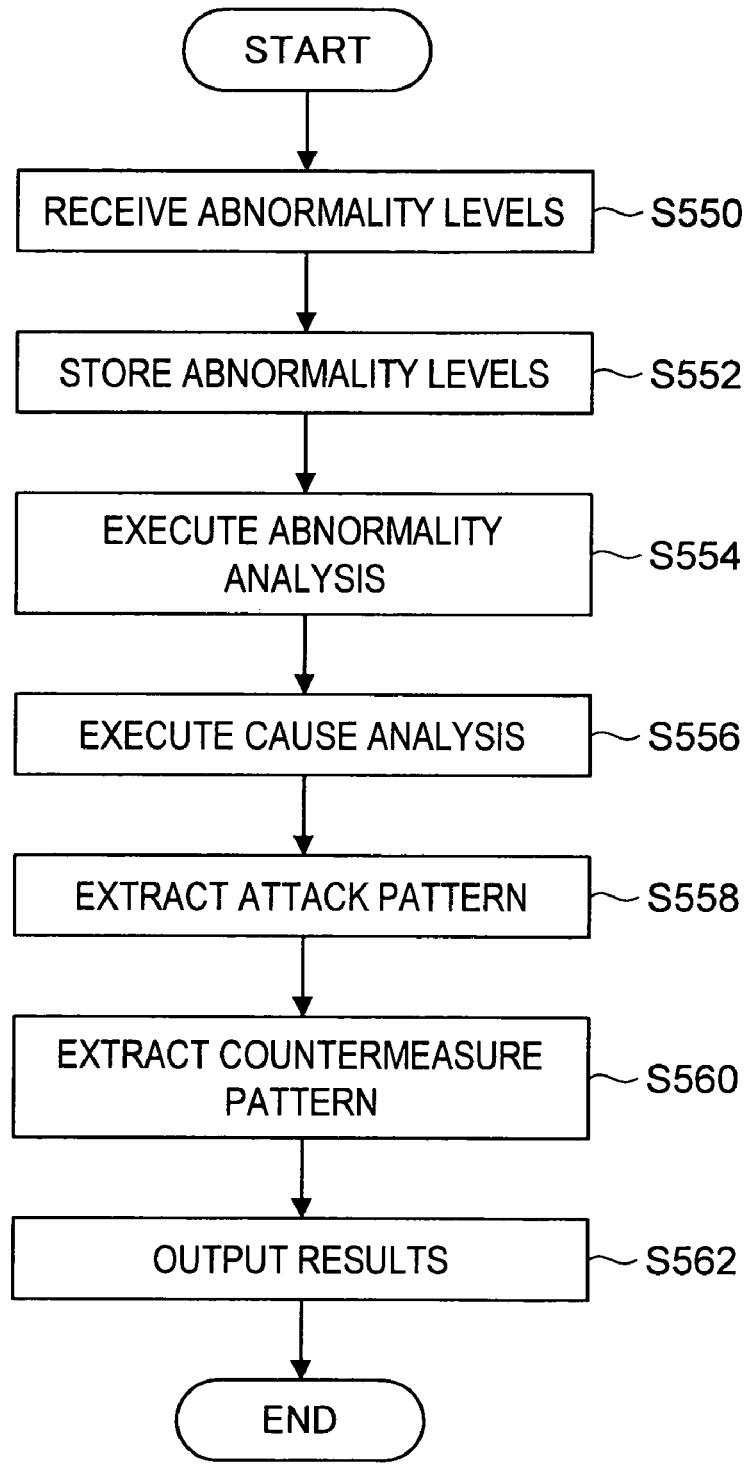
FIG. 17 presents a flowchart of the abnormality management processing executed at the abnormality management apparatus.

FIG. 17 presents a flowchart of the abnormality management executed at the abnormality management apparatus 120. The abnormality management apparatus 120 receives the information indicating the abnormality level calculated at each of the plurality of probes 110 (S550) and stores the abnormality level information thus received (S552). At this time, the abnormality management apparatus may receive and store the parameter values based upon which the abnormality level has been calculated, together with the abnormality level itself.

Next, based upon the average value of the abnormality levels at the plurality of probes 110 and the deviations of the abnormality levels at the probes 110 relative to the average value, the abnormality management apparatus 120 judges the scale of the abnormality in the network (S554). Through this processing, the scale of the abnormality having been extracted, i.e., whether the abnormality has manifested locally or over the entire network, is judged.

Next, the abnormality management apparatus 120 counts the number of probes indicating the parameter value corresponding to a single given parameter or the parameter values corresponding to a plurality of given parameters contained within an arbitrary range of the normal distribution determined in correspondence to the parameter by extracting parameter values indicated at the individual probes 110 for the particular parameter and compares the ratio (number of counted probes)/(total number of probes) with a predetermined threshold value (S556). If the ratio (number of counted probes)/(total number of probes) is equal to or greater than the predetermined threshold value, the abnormality management apparatus judges that the abnormality has occurred due to a cause related to the arbitrary parameter group constituted with a single parameter or a plurality of parameters.

Alternatively, the ratio of parameters indicating values contained within given ranges of the normal distributions each determined in correspondence to a specific parameter by extracting parameter values measured at the individual probes 110 in correspondence to the parameter, to the total number of parameters may be calculated for each probe 110 and the ratio (number of probes with a ratio equal to or greater than predetermined threshold value)/(total number of probes) may be compared with a predetermined threshold value in the cause analysis step (S556). If the ratio (number of probes with ratio equal to or greater than predetermined threshold value)/(total number of probes) is equal to or greater than the predetermined threshold value, the abnormality management apparatus judges that an abnormality has occurred due to a common cause.

The abnormality management apparatus 120 then extracts from the attack pattern storage unit 452 used as a database the attack pattern deduced based upon the abnormal probes, the abnormal parameters and the abnormal parameter values indicated in the results of the analyses executed in the abnormality analysis step (S554) and the cause analysis step (S556) as well as the likelihood of the attack pattern. It also extracts from the countermeasure pattern storage unit 456 used as a database the optimal countermeasure pattern against the attack pattern having been extracted (S560). Lastly, it outputs through the output unit such as the display unit or printer the results obtained by executing the abnormality analysis step (S554), the cause analysis step (S556), the attack pattern extraction step (S558) and the countermeasure pattern extraction step (S562).

Figure 18:
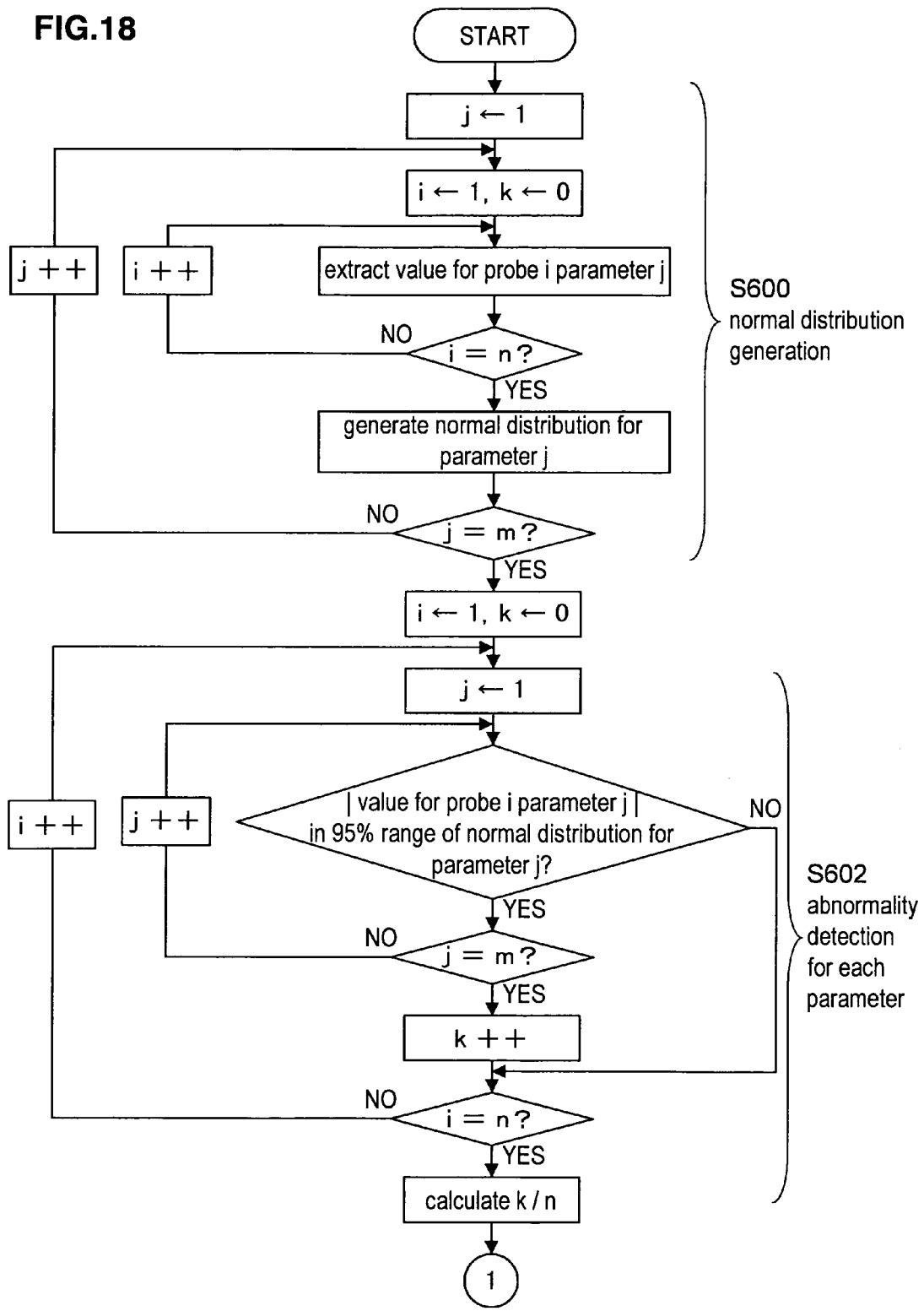
FIG. 18 presents a detailed flowchart of the processing executed in the cause analysis step.
Figure 19:
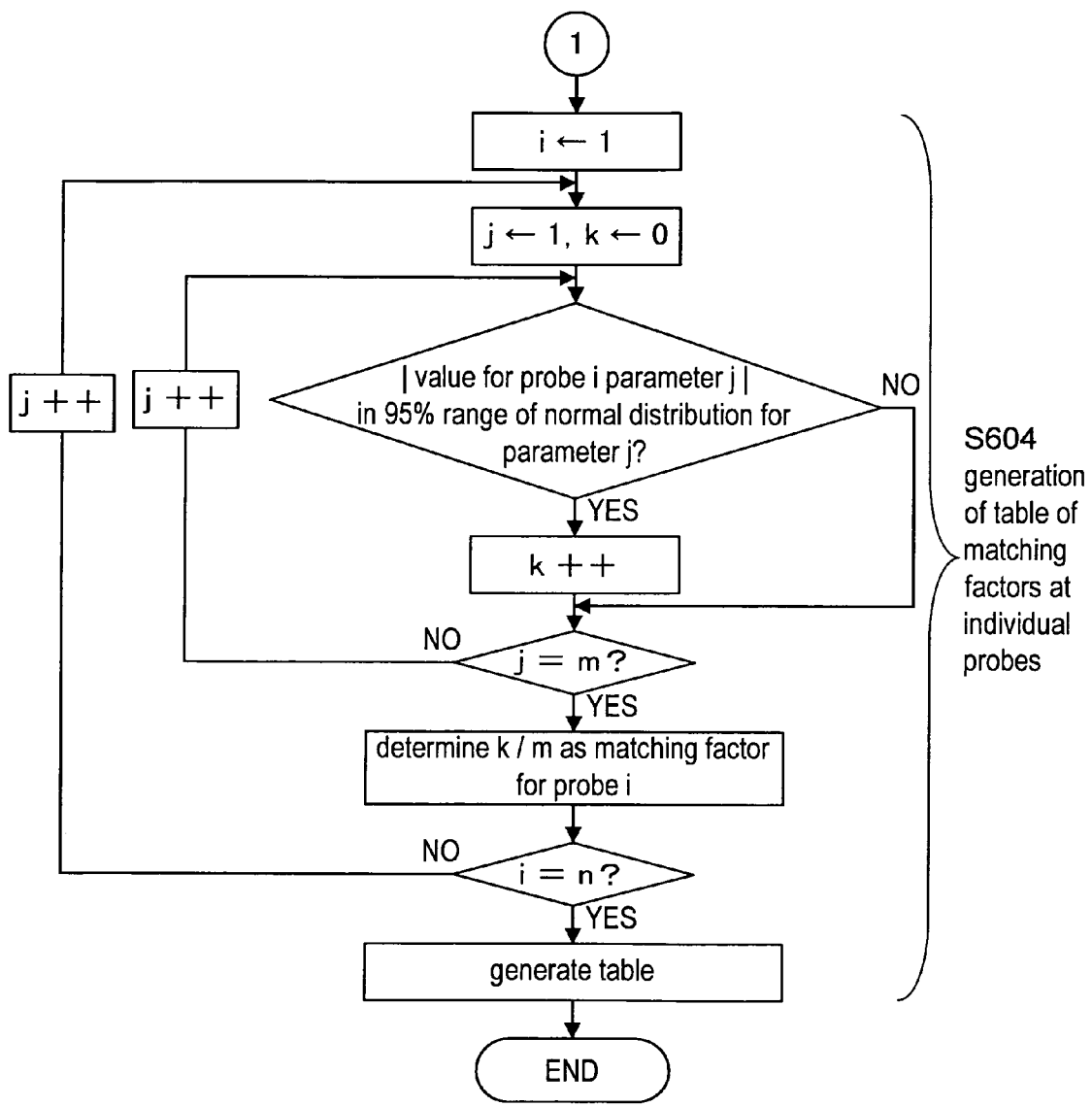
FIG. 19 presents a detailed flowchart of the processing executed in the cause analysis step.

FIGS. 18 and 19 presents a detailed flowchart of the processing executed in the cause analysis step (step S556). The explanation is given by assuming that data have been collected and accumulated at the abnormality management apparatus 120 for n probes at which parameter values corresponding to m parameters are measured. The cause analysis unit 350 in the abnormality management apparatus 120 first references the values measured at the individual probes 110 for a given parameter, which are stored in the abnormality level storage unit 314, extracts parameter values j having been provided from the probes 1 through n as sample values in the inner loop so as to determine the normal distribution of the parameter values corresponding to the given parameter j. This processing is repeatedly executed in the outer loop for each of the parameters 1 through j (S600).

Once the normal distributions of the individual parameters 1 through j are generated, an arithmetic operation is executed to determine whether or not the parameter value for the parameter j having been measured at the probe i is contained in the 95% range of the normal distribution generated for the parameter j (S602). In this embodiment, the abnormality analysis is executed on all the parameters. If the calculated value is equal to or greater than a threshold value, it is judged that the abnormality has occurred over the entire network due to a common cause.

Next, as shown in FIG. 19, a calculation is executed to determine whether or not the parameter value for another parameter j at another probe i is contained in the 95% of the normal distribution of the parameter j through a similar loop and a table is generated based upon the match factors each determined for a specific probe i (S604). The abnormality evaluation is thus executed for the individual probes (e.g., the ratio of probes with match factors equal to or greater than 80% is 60%).

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

For instance, while the normal distribution is determined by referencing data provided for the individual probes at substantially the same time point either current or past in the past to check the abnormality levels or the parameter values in the embodiment described above, the present invention is not limited to this example and a normal distribution may be determined by calculating cumulative values, each representing the sum of the abnormality level values or the sum of the parameter values corresponding to a specific parameter measured over time at a single probe. In this case, no abnormality is detected even if a high abnormality level is indicated, as long as the abnormality has been consistently high over time but instead, it is judged that an abnormality has occurred if the abnormality level significantly deviating from the stationary value is indicated.

It is to be noted that it is not strictly necessary to execute the individual steps of the abnormality management in the sequence indicated in the flowchart in the specification, and those steps may be executed concurrently or may be executed individually (e.g., parallel processing or object-based processing.

As described above, according to the present invention, the scale of an abnormality having occurred in a network can be accurately assessed and optimal action can be promptly taken to correct the abnormality by detecting its cause at an early stage. In addition, since the abnormality detection processing is facilitated, reductions in the processing load, the processing performance requirements and the costs are achieved.

The present invention may be adopted in an abnormality detection system, an abnormality management apparatus, an abnormality management method, a probe and a program executed therein, with which an abnormality in a network can be effectively managed.

What is claimed is:

1. An abnormality management apparatus connected via a network to a plurality of probes disposed at arbitrary positions in the network, comprising:
   an abnormality level reception unit that receives information indicating an abnormality level calculated at each of the plurality of probes;
   an abnormality analysis unit that judges the scale of an abnormality manifesting in the network based upon an average value of abnormality levels indicated at the plurality of probes and deviations relative to the average value; and
   a result output unit that outputs results obtained at the abnormality analysis unit, wherein:
      together with the information indicating the abnormality level calculated at each probe, the abnormality level reception unit receives values corresponding to a plurality of parameters obtained at the probe; and
      the abnormality management apparatus further includes a cause analysis unit that counts the number of probes each indicating a parameter value corresponding to a single parameter or parameter values corresponding to a plurality of given parameters (parameter group) with each of the parameter values contained in a specific range of a normal distribution corresponding to the parameter determined by extracting data from the plurality of probes and judges that an abnormality detected in the network is attributable to a cause related to in the parameter group if the value representing a ratio (number of counted probes)/(total number of probes) is equal to or greater than a predetermined threshold value.

2. An abnormality management apparatus according to claim 1, further comprising:
   an abnormality level storage unit that stores into memory the information indicating the abnormality level having been received via the abnormality level reception unit.

3. An abnormality management apparatus according to claim 1, further comprising:
   an attack pattern storage unit at which possible attack patterns are stored; and
   an attack pattern extraction unit that extracts from the attack pattern storage unit an attack pattern deduced based upon probes indicating abnormality, parameter indicating abnormality and abnormal parameter values, all indicated in results of an analysis executed by the abnormality analysis unit, and a likelihood of the deduced attack pattern.

4. An abnormality management apparatus according to claim 3, further comprising:
   a countermeasure pattern storage unit that stores countermeasure patterns; and
   a countermeasure pattern extraction unit that extracts from the countermeasure pattern storage unit a countermeasure pattern corresponding to the attack pattern having been extracted by the attack pattern extraction unit.

5. An abnormality management apparatus connected via a network to a plurality of probes disposed at arbitrary positions in the network, comprising:
   an abnormality level reception unit that receives information indicating an abnormality level calculated at each of the plurality of probes;
   an abnormality analysis unit that judges the scale of an abnormality manifesting in the network based upon an average value of abnormality levels indicated at the plurality of probes and deviations relative to the average value; and a result output unit that outputs results obtained at the abnormality analysis unit, wherein:

together with the information indicating the abnormality level calculated at each probe, the abnormality level reception unit receives values corresponding to a plurality of parameters obtained at the probe; and the abnormality management apparatus further includes a cause analysis unit that calculates for each probe the ratio of parameters with values contained in given ranges of the normal distribution each set in correspondence to a specific parameter by extracting data from the plurality of probes and judges that an abnormality detected in the network is attributable to a common cause if the value representing the ratio (number of probes each indicating a rational value equal to or greater than predetermined threshold value)/(total number of probes) is equal to or greater than a predetermined threshold value.

6. An abnormality management apparatus according to claim 5, further comprising:

an attack pattern storage unit at which possible attack patterns are stored; and an attack pattern extraction unit that extracts from the attack pattern storage unit an attack pattern deduced based upon probes indicating abnormality, parameter indicating abnormality and abnormal parameter values, all indicated in results of an analysis executed by the abnormality analysis unit, and a likelihood of the deduced attack pattern.

7. An abnormality management apparatus according to claim 6, further comprising:

a countermeasure pattern storage unit that stores countermeasure patterns; and a countermeasure pattern extraction unit that extracts from the countermeasure pattern storage unit a countermeasure pattern corresponding to the attack pattern having been extracted by the attack pattern extraction unit.

8. An abnormality management apparatus according to claim 5, further comprising:

an abnormality level storage unit that stores into memory the information indicating the abnormality level having been received via the abnormality level reception unit.

9. A program executed on a computer connected via a network to a plurality of probes disposed at arbitrary positions in the network so as to enable the computer to function as:

an abnormality level reception unit that receives information indicating an abnormality level calculated at each of the plurality of probes;

an abnormality analysis unit that judges the scale of an abnormality manifesting in the network based upon an average value of abnormality levels indicated at the plurality of probes and deviations relative to the average value; and a result output unit that outputs results obtained at the abnormality analysis unit, wherein:

together with the information indicating the abnormality level calculated at each probe, the abnormality level reception unit receives values corresponding to a plurality of parameters obtained at the probe; and the abnormality management apparatus further includes a cause analysis unit that counts the number of probes each indicating a parameter value corresponding to a single parameter or parameter values corresponding to a plurality of given parameters (parameter group) with each of the parameter values contained in a specific range of a normal distribution corresponding to the parameter determined by extracting data from the plurality of probes and judges that an abnormality detected in the network is attributable to a cause related to in the parameter group if the value representing a ratio (number of counted probes)/(total number of probes) is equal to or greater than a predetermined threshold value.

10. An abnormality management method managing abnormalities in an abnormality management apparatus connected via a network to a plurality of probes disposed at arbitrary positions in the network, comprising:

an abnormality level reception step in which information indicating abnormality levels calculated at the plurality of probes are received;

an abnormality analysis step in which the scale of an abnormality in the network is judged based upon an average value of the abnormality levels at the plurality of probes and deviations of the abnormality levels at the plurality of probes relative to the average value; and a result output step in which results obtained through the abnormality analysis step are output, wherein:

together with the information indicating the abnormality level calculated at each probe, the abnormality level reception unit receives values corresponding to a plurality of parameters obtained at the probe; and the abnormality management apparatus further includes a cause analysis unit that counts the number of probes each indicating a parameter value corresponding to a single parameter or parameter values corresponding to a plurality of given parameters (parameter group) with each of the parameter values contained in a specific range of a normal distribution corresponding to the parameter determined by extracting data from the plurality of probes and judges that an abnormality detected in the network is attributable to a cause related to in the parameter group if the value representing a ratio (number of counted probes)/(total number of probes) is equal to or greater than a predetermined threshold value.

11. A program executed on a computer connected via a network to a plurality of probes disposed at arbitrary positions in the network so as to enable the computer to function as:

an abnormality level reception unit that receives information indicating an abnormality level calculated at each of the plurality of probes;

an abnormality analysis unit that judges the scale of an abnormality manifesting in the network based upon an average value of abnormality levels indicated at the plurality of probes and deviations relative to the average value; and a result output unit that outputs results obtained at the abnormality analysis unit, wherein:

together with the information indicating the abnormality level calculated at each probe, the abnormality level reception unit receives values corresponding to a plurality of parameters obtained at the probe; and the abnormality management apparatus further includes a cause analysis unit that calculates for each probe the ratio of parameters with values contained in given ranges of the normal distribution each set in correspondence to a specific parameter by extracting data from the plurality of probes and judges that an abnormality detected in the network is attributable to a common cause if the value representing the ratio (number of probes each indicating a rational value equal to or greater than predetermined threshold value)/(total number of probes) is equal to or greater than a predetermined threshold value.

12. An abnormality management method managing abnormalities in an abnormality management apparatus connected via a network to a plurality of probes disposed at arbitrary positions in the network, comprising:

an abnormality level reception step in which information indicating abnormality levels calculated at the plurality of probes are received;

an abnormality analysis step in which the scale of an abnormality in the network is judged based upon an average value of the abnormality levels at the plurality of probes and deviations of the abnormality levels at the plurality of probes relative to the average value; and a result output step in which results obtained through the abnormality analysis step are output, wherein:

together with the information indicating the abnormality level calculated at each probe, the abnormality level reception unit receives values corresponding to a plurality of parameters obtained at the probe; and the abnormality management apparatus further includes a cause analysis unit that calculates for each probe the ratio of parameters with values contained in given ranges of the normal distribution each set in correspondence to a specific parameter by extracting data from the plurality of probes and judges that an abnormality detected in the network is attributable to a common cause if the value representing the ratio (number of probes each indicating a rational value equal to or greater than predetermined threshold value)/(total number of probes) is equal to or greater than a predetermined threshold value.

* * * * *

UNITED STATES PATENT AND TRADEMARK OFFICE
CERTIFICATE OF CORRECTION

PATENT NO. : 7,594,014 B2
APPLICATION NO. : 11/498809
DATED : September 22, 2009
INVENTOR(S) : Nobuyuki Nakamura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 629 days.

Signed and Sealed this

Fourteenth Day of December, 2010

David J. Kappos
*Director of the United States Patent and Trademark Office*